US00RE47724E

(19) United States
(12) Reissued Patent
Williams

(10) Patent Number: US RE47,724 E
(45) Date of Reissued Patent: *Nov. 12, 2019

(54) EYEWEAR RETENTION DEVICE

(71) Applicant: CABLZ, INC., Birmingham, AL (US)

(72) Inventor: Ronald Wade Williams, Birmingham, AL (US)

(73) Assignee: CABLZ, INC., Birmingham, AL (US)

( * ) Notice: This patent is subject to a terminal disclaimer.

(21) Appl. No.: 13/660,706

(22) Filed: Oct. 25, 2012

Related U.S. Patent Documents

Reissue of:
(64) Patent No.: 7,845,795
Issued: Dec. 7, 2010
Appl. No.: 12/647,307
Filed: Dec. 24, 2009

U.S. Applications:
(63) Continuation-in-part of application No. PCT/US2009/043156, filed on May 7, 2009, and a continuation-in-part of application No. 29/336,725, filed on May 7, 2009, now Pat. No. Des. 607,919.

(60) Provisional application No. 61/051,539, filed on May 8, 2008.

(51) Int. Cl.
*G02C 3/00* (2006.01)

(52) U.S. Cl.
CPC ..... *G02C 3/003* (2013.01)

(58) Field of Classification Search
CPC ..... G02C 3/003
USPC ..... 351/156, 157, 158, 41; 2/452; D16/339, D16/329, 101, 300–324
See application file for complete search history.

(56) References Cited

U.S. PATENT DOCUMENTS 182,013 A 9/1876 Andross
1,026,272 A 5/1912 Leveque
(Continued)

FOREIGN PATENT DOCUMENTS

AU 680188 7/1997
DE 29908337 U1 11/1999
(Continued)

OTHER PUBLICATIONS

Monroe, B. "Outdoor folks don't use trendy glasses-holders." *The Oregonian.* (Jul. 4, 1991), p. E4.*
(Continued)

*Primary Examiner* — Sara S Clarke
(74) *Attorney, Agent, or Firm* — C. Brandon Browning; Maynard, Cooper & Gale, PC

(57) ABSTRACT

An adjustable eyewear retention device [having two] *comprising a resilient elongate member adjustable in length, such as a pair of* cables, [two] *and a pair of* temple retainers *connected to one another by the elongate member*, [guiding means and grasping means which allow adjustment of the device to the dimensions of a user's head. In another embodiment, the guiding means is eliminated and the cables are connected by means of the grasping means] *such that when the temple retainers are attached to the temples of a pair of eyeglasses and the eyeglasses are worn by a wearer, the resilient member forms an arc suspended off the wearer's neck.*

13 Claims, 9 Drawing Sheets

(56) References Cited

U.S. PATENT DOCUMENTS

| | | | | | |
|---|---|---|---|---|---|
| 1,819,738 | A | * | 8/1931 | Daniels | G02C 3/003 351/156 |
| 2,704,961 | A | | 3/1955 | Weil | 351/157 |
| 3,450,467 | A | * | 6/1969 | Phillips | 351/157 |
| 3,673,610 | A | | 7/1972 | Liautaud | |
| 3,728,012 | A | | 4/1973 | Downey | |
| 4,133,604 | A | | 1/1979 | Fuller | 351/123 |
| 4,541,696 | A | | 9/1985 | Winger | |
| 4,692,002 | A | | 9/1987 | Meistrell | |
| 4,696,556 | A | | 9/1987 | Perry | |
| 4,793,702 | A | | 12/1988 | Ahrens | |
| 4,820,036 | A | | 4/1989 | Seet | |
| 4,922,581 | A | | 5/1990 | Wilson | |
| 4,955,710 | A | | 9/1990 | Meistrell | |
| 5,015,085 | A | | 5/1991 | May | |
| 5,074,565 | A | | 12/1991 | Parrish | |
| 5,092,668 | A | | 3/1992 | Welch | 351/156 |
| D328,908 | S | | 8/1992 | Kalbach | |
| 5,181,052 | A | | 1/1993 | McClellan | |
| 5,191,363 | A | | 3/1993 | Smith | |
| 5,247,814 | A | * | 9/1993 | McDonald | 63/3.2 |
| 5,369,542 | A | | 11/1994 | Leone et al. | |
| 5,384,605 | A | | 1/1995 | Escobosa | |
| 5,390,434 | A | | 2/1995 | Lockard | |
| 5,575,042 | A | | 11/1996 | Kalbach | 24/3.3 |
| 5,664,291 | A | * | 9/1997 | Stoller | 24/3.3 |
| 5,735,393 | A | | 4/1998 | Hermansen | |
| D411,562 | S | | 6/1999 | Riley | |
| 6,053,612 | A | | 4/2000 | MacIntosh | |
| D424,600 | S | | 5/2000 | Riley | |
| D432,556 | S | | 10/2000 | Lando | |
| 6,182,334 | B1 | | 2/2001 | Davancens | |
| 6,233,345 | B1 | | 5/2001 | Urwyler | |
| 6,247,811 | B1 | | 6/2001 | Rhoades | |
| 6,478,419 | B1 | | 11/2002 | McDaniel | |
| 6,629,760 | B1 | | 10/2003 | Razin | |
| 6,644,803 | B1 | | 11/2003 | Liu | |
| 6,644,808 | B1 | | 11/2003 | Liu | 351/156 |
| D486,174 | S | | 2/2004 | Chisolm | |
| D486,511 | S | | 2/2004 | Kalbach | |
| 6,690,808 | B2 | | 2/2004 | Urwyler | |
| 6,709,100 | B2 | | 3/2004 | Kalbach | |
| 6,736,504 | B1 | | 5/2004 | Hermsen | |
| 6,764,177 | B1 | | 7/2004 | Chisolm | |
| 6,817,069 | B1 | | 11/2004 | Tillstrom | |
| 6,941,619 | B2 | | 9/2005 | MacKay | 24/3.3 |
| D513,519 | S | | 1/2006 | Chisolm | |
| D536,364 | S | | 2/2007 | Kalbach | |
| 7,284,855 | B2 | | 10/2007 | Bent | 351/156 |
| D567,279 | S | | 4/2008 | Chisolm | |
| 7,467,867 | B1 | | 12/2008 | Williams | 351/156 |
| D588,184 | S | | 3/2009 | Lane | |
| D590,008 | S | | 4/2009 | Lane | |
| D590,009 | S | | 4/2009 | Lane | |
| D590,344 | S | | 4/2009 | Suematsu et al. | |
| D607,919 | S | * | 1/2010 | Williams | D16/339 |
| 7,780,289 | B2 | | 8/2010 | Pettingill | |
| 7,828,429 | B2 | | 11/2010 | Spinnato | |
| 7,926,937 | B2 | | 4/2011 | Spinnato | |
| 8,092,009 | B2 | | 1/2012 | Williams | |
| 8,366,268 | B2 | | 2/2013 | Williams | |
| 2007/0046889 | A1 | | 3/2007 | Miller | |
| 2007/0248238 | A1 | | 10/2007 | Abreu | |

FOREIGN PATENT DOCUMENTS

| | | |
|---|---|---|
| EP | 0537390 A1 | 10/1991 |
| GB | 2280042 | 1/1995 |
| WO | 0053269 A1 | 9/2000 |

OTHER PUBLICATIONS

Kalan, Administrative Patent Judge "Decision Institution of Inter Partes Review 37 C.F.R. 42.108" United States Patent and Trademark Office/Before the Patent Trial and Appeal Board/*Chums, Inc., and Croakies, Inc.*, Petitioners v. *CABLZ, Inc.* Patent Owner/Case IPR 2014-01240 U.S. Pat. No. 8,366,268 B2; Paper 10; Issued Feb. 10, 2015; pp. 1-19.

John Krisik "Transmittal letter enclosing samples of the Croakies Braided Leather Sport Eyewear Retainer" Feb. 12, 2014; 1 page.

Expert Report of Beirne Chisolm in *Cablz, Inc.* v. *Chums, Inc.*, Aug. 21, 2014 (revised).

Expert Report of Lee Moradi in *Cablz, Inc.* v. *Chums, Inc.*, Jun. 30, 2014.

Expert Report of Joe Jernigan in *Cablz, Inc.* v. *Chums, Inc.*, Jun. 30, 2014.

Expert Report of Steven Visser in *Cablz, Inc.* v. *Chums, Inc.*, May 30, 2014.

Expert Report of Steven Visser in *Cablz, Inc.* v. *Chums, Inc.* Aug. 1, 2014.

Expert Report of Mark Sosin in *Cablz, Inc.* v. *Chums, Inc.* Aug. 1, 2014.

Expert Report of Kevin Banks in *Cablz, Inc.* v. *Chums, Inc.* Aug. 1, 2014.

Discovery Response of Cablz, Inc. in *Cablz, Inc.* v. *Chums, Inc.* Apr. 23, 2014.

Discovery Response of Cablz, Inc. in *Cablz, Inc.* v. *Chums, Inc.* Jul. 18, 2014.

Discovery Response of Chums Inc. in *Cablz, Inc.* v. *Chums, Inc.* Apr. 22, 2014.

Discovery Response of Chums Inc. in *Cablz, Inc.* v. *Chums, Inc.* Jul. 18, 2014.

Counterclaim of Croakies, Inc. in *Cablz, Inc.* v. *Croakies* May 30, 2014.

Cablz, Inc.'s Motion to Dismiss Counterclaim of Croakies, Inc. in *Cablz, Inc.* v. *Croakies* Jul. 11, 2014.

Petition for Inter Partes Review of Chums, Inc. and Croakies, Inc. #IPR2014-01240; Aug. 1, 2014.

Sunbelt Retainer.

Andres, Kenneth, Deposition of in *Cablz, Inc.* v. *Chums, Inc.* Jul. 17, 2014.

Banks, Kevin, Deposition of in *Cablz, Inc.* v. *Chums, Inc.* Aug. 21, 2014.

Chisolm, Beirne, Deposition of in *Cablz, Inc.* v. *Chums, Inc.* Aug. 22, 2014.

Ferries, Tom, Deposition of in *Cablz, Inc.* v. *Chums, Inc.* Aug. 19, 2014.

Jernigan, Joe, Deposition of in *Cablz, Inc.* v. *Chums, Inc.* Aug. 12, 2014.

Krisik, John, Deposition of in *Cablz, Inc.* v. *Chums, Inc.* Jun. 5, 2014.

Moradi, Lee, Deposition of in *Cablz, Inc.* v. *Chums, Inc.* Aug. 28, 2014.

Nussman, Michael, Deposition of in *Cablz, Inc.* v. *Chums, Inc.* Jul. 17, 2014.

Sosin, Mark, Deposition of in *Cablz, Inc.* v. *Chums, Inc.* Aug. 19, 2014.

Visser, Steven, Deposition of in *Cablz, Inc.* v. *Chums, Inc.* Aug. 15, 2014.

Williams, Holly, Deposition of in *Cablz, Inc.* v. *Chums, Inc.* Jul. 9, 2014.

Williams, Holly, Deposition of in *Cablz, Inc.* v. *Chums, Inc.* Aug. 29, 2014.

Williams, Ron, Deposition of in *Cablz, Inc.* v. *Chums, Inc.* Aug. 1, 2014.

Proposed Amended Counterclaim of Chums in *Cablz, Inc.* v. *Chums, Inc.* Jul. 23, 2014.

First Package Jul. 2008.

Yellow Mannequin Jul. 2008.

Product Flyer Jul. 2008.

Second Package Dec. 2008.

Jan. 2009 Show Literature.

First Brochure Apr. 2009.

Third Package Apr. 2009.

* cited by examiner

FIG. 1
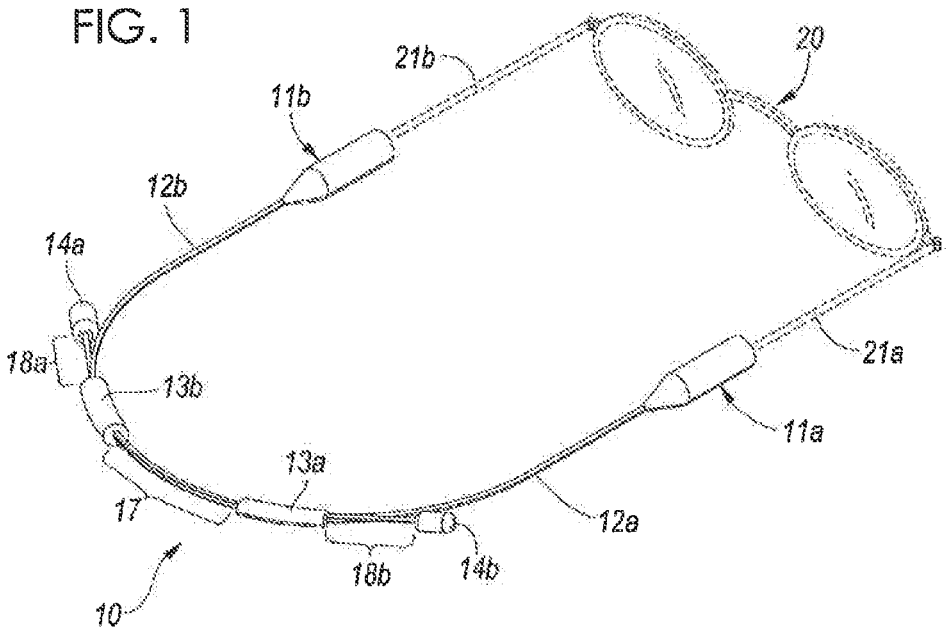
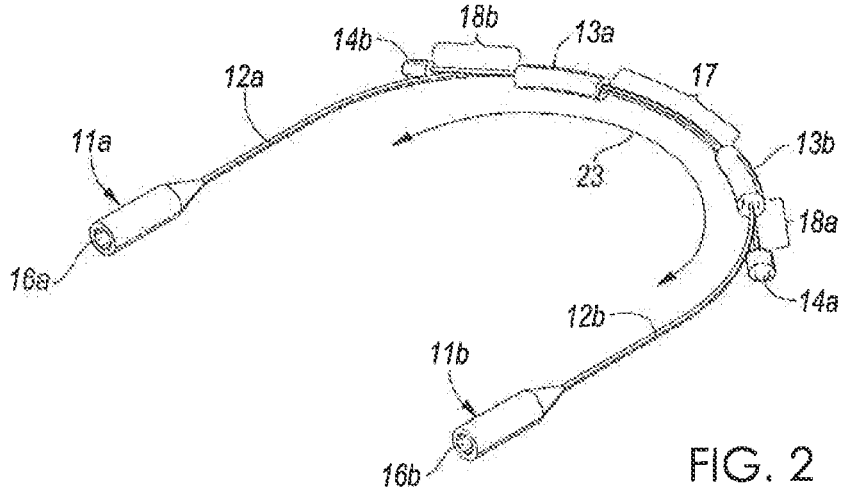
FIG. 2

EYEWEAR RETENTION DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This is a utility continuation of design patent application 29/336,725 entitled "Adjustable Eyewear Retention Device."] *This application is a continuation-in-part of PCT Application No. PCT/US09/43156 filed May 7, 2009 (now expired), which claims priority to U.S. Provisional Application No. 61/051,539, filed May 8, 2008 (now expired). This application is a continuation of U.S. patent application Ser. No. 29/336,725 filed May 7, 2009, now U.S. Pat. D607,919.*

FIELD OF INVENTION

The present invention relates generally to devices that retain eyewear on a user.

BACKGROUND OF THE INVENTION

U.S. Pat. No. 7,467,867 issued to Williams discloses an eyewear retention device having two temple retainers connected by a cable which, when attached to eyeglasses and worn over the ears by a user, maintains a suspended arc over the wearer's neck, shoulders or garments. Williams' design, however, does not specifically address the need for holding the eyewear securely against a user's face during rigorous activity.

What is needed is a superior eyewear retainer design that incorporates adjustability in its structure so that a wearer may easily disengage the retention device in an adjustable fashion and maintain the advantages of the suspended arc in Williams.

SUMMARY OF INVENTION

An adjustable eyewear retention device is disclosed that includes two cables, two temple retainers (one at each end of the cable), and means for adjusting the cables at the back of a user's head. The two cables are the same length, partially overlap one another, and create an arc when the [invention] *device* is attached to eyeglasses. In one embodiment at least one guide for the two cables is provided. The guide contains at least one tunnel or hole which keeps the two cables in close proximity and also allows *at least one of* the two cables to pass through slideably. In one embodiment the guide has a tunnel for each of the two cables and, in another embodiment, the two cables pass through the same tunnel or hole in the guide. A tab for adjustment is secured to the end of each cable opposite the temple retainer. In one embodiment the tab also contains a tunnel or hole for allowing the other cable to pass through slideably, thus *acting as a guide and* keeping the other cable in a defined path in the arc. In another embodiment, the tab is secured only to the end of one cable and the other cable does not pass through the tab, so the cable with the tab in this embodiment is not in the defined path of the arc. In all embodiments of the invention the tabs allow adjustment by increasing or decreasing the length of the arc.

BRIEF DESCRIPTION OF THE DRAWINGS

An adjustable eyewear retention device incorporating the features of the invention is depicted in the attached figures:

FIG. 1 is a rear perspective view *of one embodiment* of the invention with two guides in combination with a pair of eyeglasses shown with broken lines appearing for illustrative purposes only.

FIG. 2 is a front perspective view of the [invention with two guides] *embodiment of FIG. 1.*

DESCRIPTION OF THE PREFERRED EMBODIMENT

Figure 3:
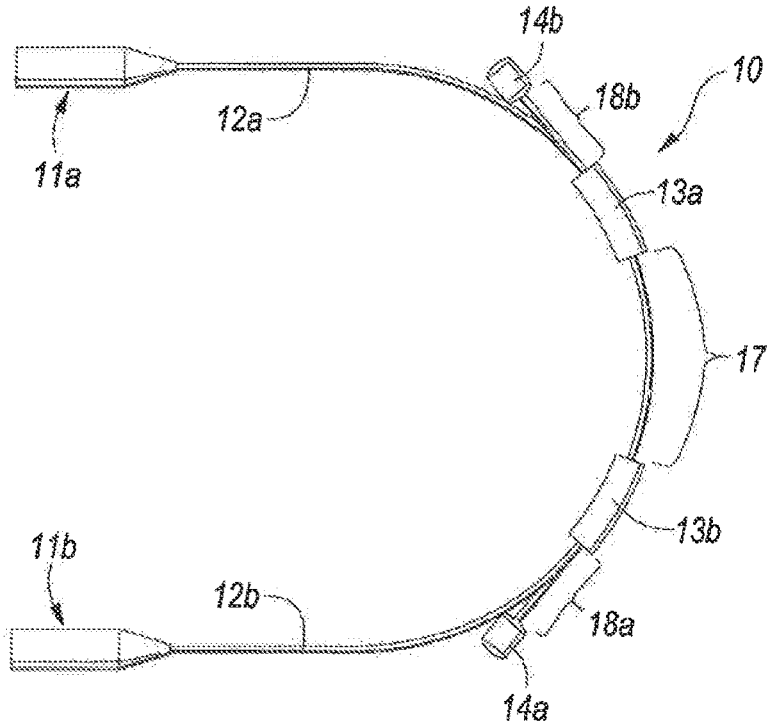
FIG. 3 is a top plan view of the [invention with two guides] *embodiment of FIG. 1.*

Referring to the figures for a better understanding of the function and structure of [the] *various embodiments of the* invention, FIG. 1 shows *an embodiment of* the [invention]

*apparatus* 10 connected with a pair of eyeglasses 20 in which temples 21 a,b are inserted into retainers 11 a,b and from which cables 12a,b extend longitudinally away from retainers 11 a,b. The structure and functioning of retainers 11 and cables 12 is more fully described in U.S. Pat. No. 7,467,867 B1 and in U.S. patent application Ser. No. 12/640,872 which are hereby incorporated by reference in their entirety.

Referring now to FIG. 2, it may be seen that temples 21 of eyeglasses 20 are placed within apertures 16a,b of retainers 11 and held fast within the temple retainers. Other means for retaining the temples to the [invention] *apparatus 10* are known to persons of ordinary skill in the art. Due to the resilient properties of cables 12, the cables maintain an arcuate shape 23 around the rear of a wearer's head when attached to a pair of eyeglasses such that the cables and intersecting structures permitting the adjustability of [invention] *apparatus* 10 will be suspended in an arc above the wearer's neck, shoulders or garments. This self-suspending positioning of the cables 12 prevents the [invention] *apparatus* 10 generally, but especially the cables 12 from becoming soiled with debris from a wearer's skin or garments, and also prevents interference from the wearer's garments.

As shown, each cable 12 extends in an arc 23 around an overlapping portion of the other cable with one end of each cable secured to a tab 14a,b. Preferably, cable 12 is composed of a resilient material, such as a plastic coated twisted metal cable, plastic monofilament line, or semi-solid plastic tubing. While the preferred embodiment utilizes plastic coated twisted metal cable, any of the other aforementioned resilient cables can be utilized with satisfactory results. Guides 13a,b work cooperatively to hold cables 12a,b together in close proximity to one another and, in one embodiment, are comprised of a hollow, relatively thick walled plastic material through which cables 12a,b may pass simultaneously in parallel fashion. The guides may be constructed of any materials of sufficient strength. The guides 13a,b each have a length sufficient to promote parallel positioning of cables 12a,b such that each cable tracks the other around the arc 23. Guides 13 may have a linear shape or may also, preferably, have a slightly arcuate shape to further promote arc 23. Guides 13a,b each may have a single tunnel providing sufficient space to allow the cables 12a,b to pass through simultaneously, against one another, and in a parallel traversing configuration. However, in the preferred embodiment, the passage of cables 12 through guide 13 fit snugly within guide 13 in twin hollow longitudinal tunnels in the guide 13, each tunnel in close proximity to the other, but separate. Each tunnel is sized such that the tunnel walls exert frictional forces on cables 12a and 12b to prevent spontaneous movement of each cable within the guide during strenuous physical activity or in response to relatively strong gravitational forces upon the [invention's] *apparatus's* 10 orientation.

As those skilled in art will recognize, guides 13a,b must allow for the free passage of cables 12, although under a frictional loading, so that tabs 14a and 14b may be grasped, pulled, and the cables moved to allow for closure of cables 12a,b through the progressive overlapping of each cable, thereby cinching the apparatus upon the rear portion of the user's head. As will also be noted, there are areas of overlap, namely 17 and 18a,b, that will vary in dimensional length depending upon the position of tabs 14. As tabs 14a and 14b are pulled apart from one another, guides 13a and 13b will move toward one other and toward a virtual center point of arc 23, thereby decreasing the dimension space 17.

Figure 4:
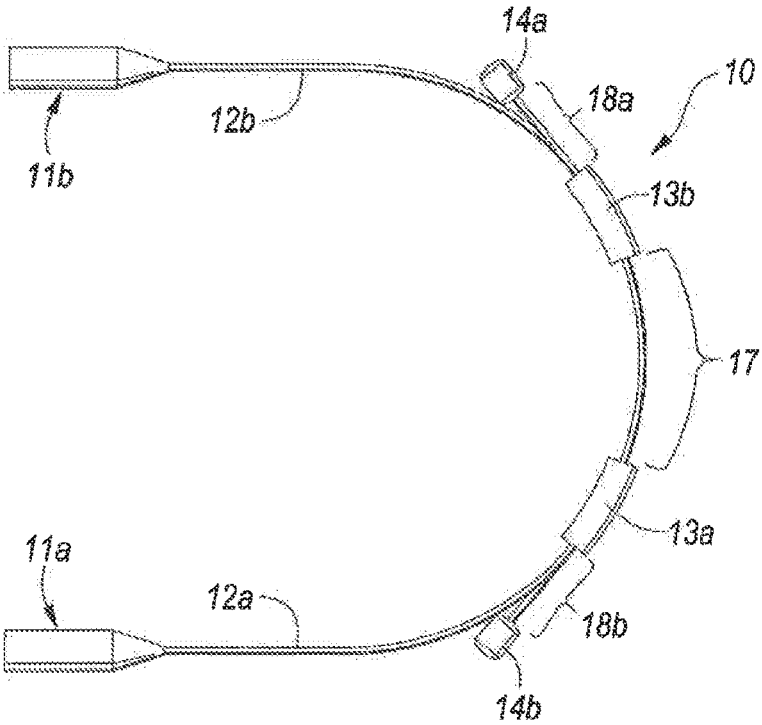
FIG. 4 is a bottom plan view of the [invention with two guides] *embodiment of FIG. 1.*

Referring to FIGS. 3 and 4, tabs 14a,b protrude slightly away from arc 23 so that a user may reach behind each her ears and grasp the tabs 14 on each side. Since tabs 14a,b may encounter strong torsional forces from a user's tugging, these tabs must, preferably, be securely fused to the ends of cables 12a and 12b, and also preferably include such resiliency that cables 12a and 12b would separate from temple retainers 11a and 11b, respectively, before tabs 14a,b detach from the end of each cable.

While the guides 13 and the tabs 14 have been shown in generic geometries, the inventor envisions variations of ornamental geometries and/or designs to be integrated with these structures in order to enhance the attractiveness to consumers and increase sales of apparatus 10.

Figure 5:
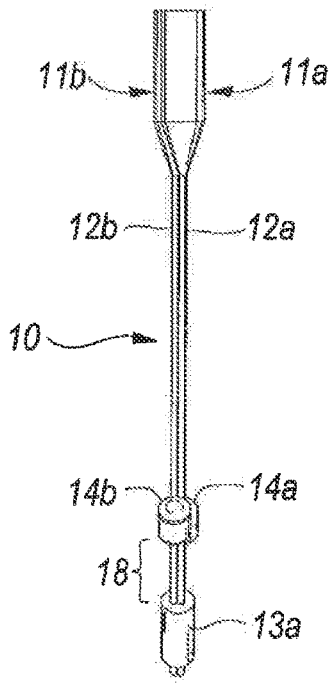
FIG. 5 is a left side elevational view of the [invention with two guides] *embodiment of FIG. 1.*
Figure 6:
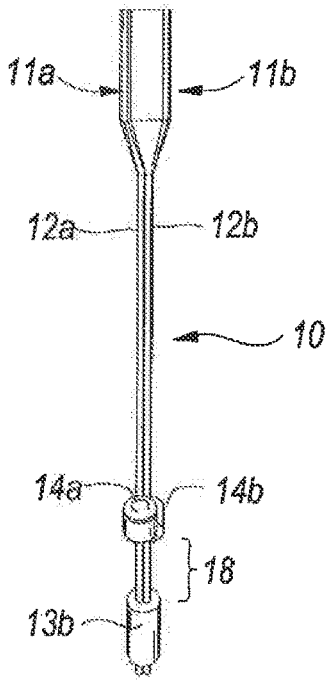
FIG. 6 is a right side elevational view of the [invention with two guides] *embodiment of FIG. 1.*

Referring to FIGS. 5 and 6, it may be seen that the positioning of guides 13a,b are positioned along cables 12a,b to allow adjustment into a snugly fitting position.

Figure 7:
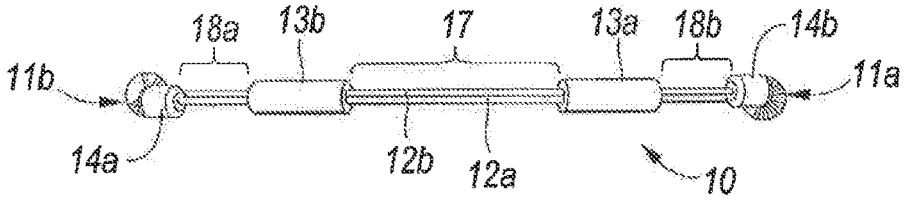
FIG. 7 is a rear elevational view of the [invention with two guides] *embodiment of FIG. 1.*
Figure 8:
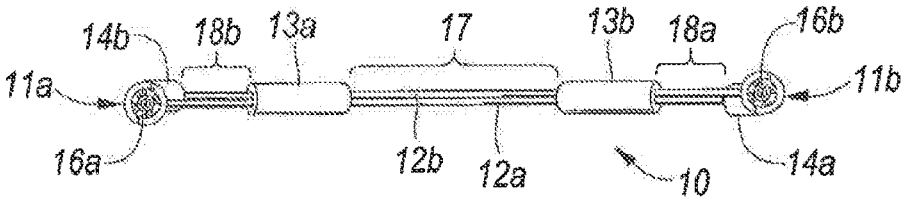
FIG. 8 is a front elevational view of the [invention with two guides] *embodiment of FIG. 1.*

As more easily seen in FIGS. 7 and 8, the cables 12a,b may be positioned one above the other (i.e., juxtapositioned) and almost touching, so the guides 13 cause a more secure orientation for each cable against the wearer's head, thereby increasing stability. Further, while the inventor has appropriately sized the internal diameter of the guides 13 to restrict the movement of cables 12a,b relative to one another, the inventor has envisioned that one cable may be affixed within guides 13a,b so that only a cable having a tab closest to that guide may be permitted movement. For example, cable 12a within guide 13a may be fixed within guide 13a, but cable 12b may continue to slide within guide 13a, and cable 12b within guide 13b may be fixed within guide 13b. By affixing one cable within guide 13, each guide would resist movement along the cable having a temple retainer closest to that guide, but would allow the cable having a tab closest to that guide to move freely. This type of configuration fixes the distance between the guide and its closest temple retainer, and helps to keep the positioning of the guides toward the rear area of a user's head.

Figure 9:
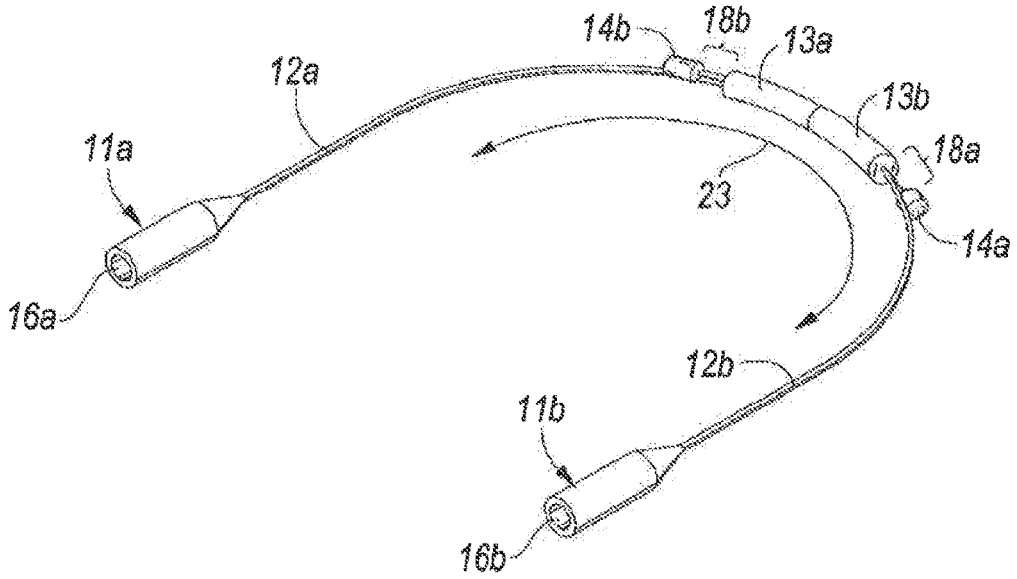
FIG. 9 is a front perspective view of the [invention] *embodiment of FIG. 1* with [two] *the* guides adjusted to an ultimate closed position.

Referring now to FIG. 9, it may be seen that tabs 14a,b have been pulled such that guides 13a,b have moved toward one another until they almost touch. This decreases the dimension 17, until at its ultimate closed position, guides 13a,b would contact and bear against one another. Upon guides 13 contacting one another, further pulling on tabs 14 causes lengthening of distances 18a,b, further closing the diameter of arc 23 and tightening the apparatus 10 against the back of a wearer's head. This positioning would represent a cinched or closed position that apparatus 10 would permit on a wearer's head to snugly fit a pair of eyeglasses to the eyes. One will also notice that tabs 14a,b may protrude slightly away from cables 12a,b, respectively, when pulled to their tightest fitting extent. However, guides 13a,b should be dimensioned such that tabs 14 would remain relatively close to cables 12 so as to remain out of the way of the user, and not droop down into other items that a wearer may have on her upper torso, such as jewelry or clothing.

In order for a wearer to reverse the maximum closed position, one would simply need to grasp guides 13a and 13b and separate them by pulling outward and around the back of the head, toward the front of the head until contacting tabs 14. Upon contact with tabs 14 with guides 13, the maximum expansion of apparatus 10 can be reached by continuing pressure on tabs 14, thereby expanding dimension 17 (see FIG. 4). The aforestated configuration and the actuation of tabs 14 relative to movement of guides 13 allows a wearer to easily and spontaneously adjust the dimensions of apparatus 10 to accomplish the rapid repositioning of eyeglasses 20. By expanding the sizing of cables 12 relative to one another, the wearer may easily detach the eyeglasses from their positions over the ears and rest the eyeglasses upon the upper front vestment of the wearer's clothes. This allows a wearer to remove eyeglasses quickly for activities with the unaided eye in situations where the optical properties of the eyeglasses are not appropriate for a wearer's environment. For example, a near-sighted individual may remove glasses after proper actuation of guides 13 and tabs 14 to allow the eyeglasses to rest on their upper chest vestment while the wearer does un-aided eye, close-up work. For another example, a nearsighted fisherman may wish to tie a knot onto a hook or other type of fishing tackle without his or her eyeglasses, and then when finished may wish to restore the eyeglasses, snugly against his face. This can easily be accomplished with the pulling of tabs 14 to secure the eyeglasses upon the rear of his head when wishing to resume vigorous fishing activities and to utilize his glasses to focus on objects farther away. Other anticipated actuations of the apparatus would be when a fisherman on a boat needs to go below deck to pursue navigation activities and the tinting properties of the eyeglasses are too extreme to permit the proper viewing of navigational charts in a darkened environment below a boat's deck. The apparatus 10 could be loosened for studying a chart, and then restored after returning to a sun-lit environment in accordance with the procedure described above. Hence, *embodiments of* the invention [allows] *allow* for rapid removal and repeated adjustment of eyeglasses and promotes their greater utility.

Figure 10:
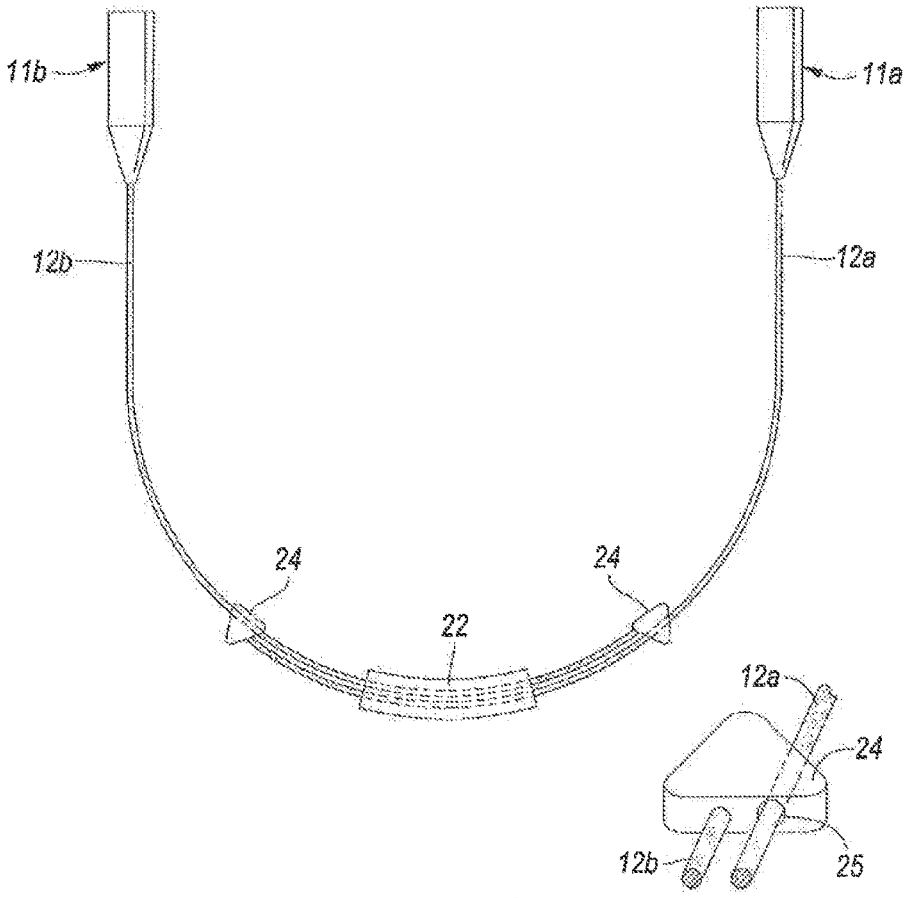
FIG. 10 is a top plan view of *another embodiment of* the invention, with [one guide and two tabs, each tab secured to the end of one cable and also having a tunnel for allowing the other cable to pass through slideably. Additionally, there is] an inset showing a close-up view of [the] *a* tab which secures the end of one of the cables and also has a tunnel to allow the other cable to pass slideably through the tab.
Figure 11:
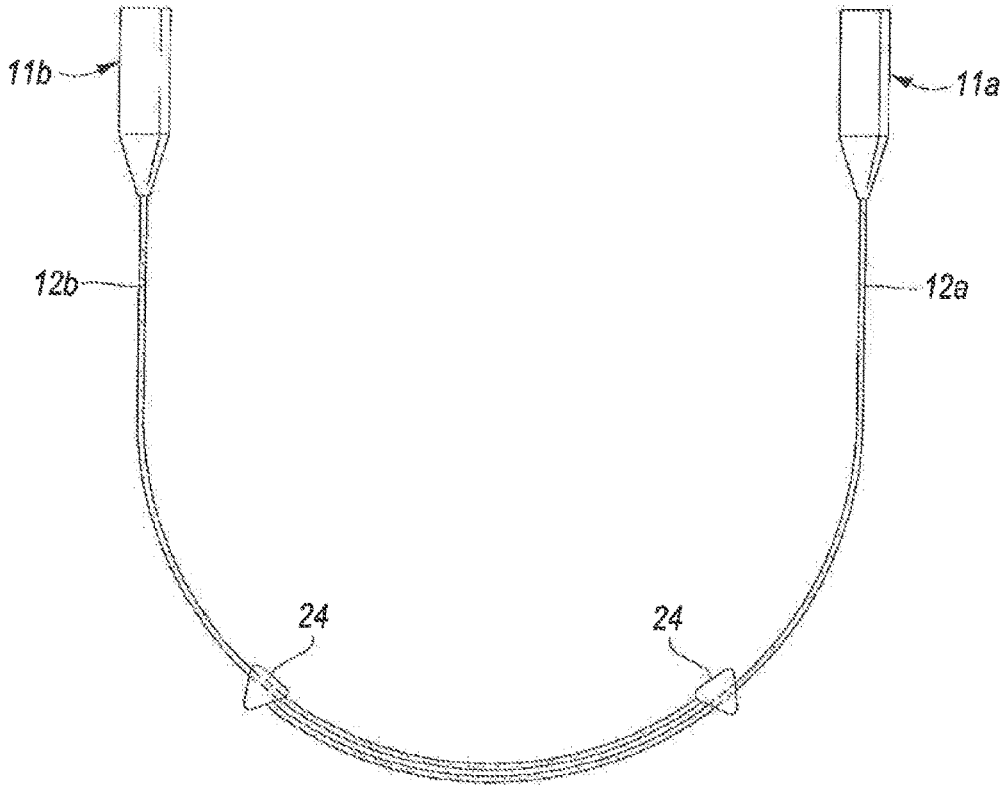
FIG. 11 is a top plan view of *another embodiment of* the invention [without a guide for the cables and two tabs, each tab secured to the end of one cable and also having a tunnel for allowing the other cable to pass through slideably].
Figure 12B:
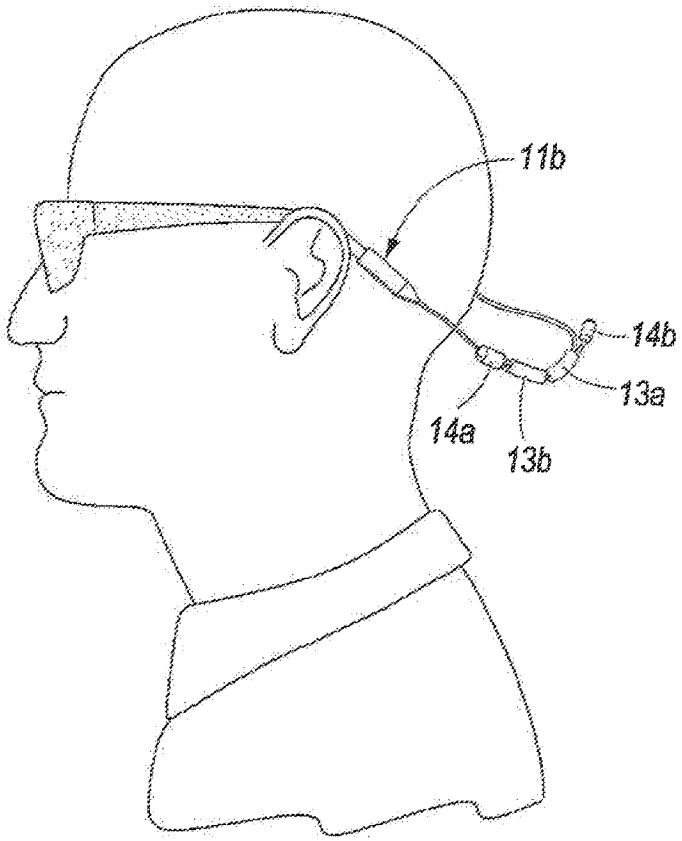
FIG. 12 contains two left side views of the embodiment [with two guides as] *of FIG. 1* attached to eyeglass temples and worn over the ears, 12a showing the [invention] *device* adjusted inwardly toward the head, and 12b showing outward adjustment.
Figure 12A:
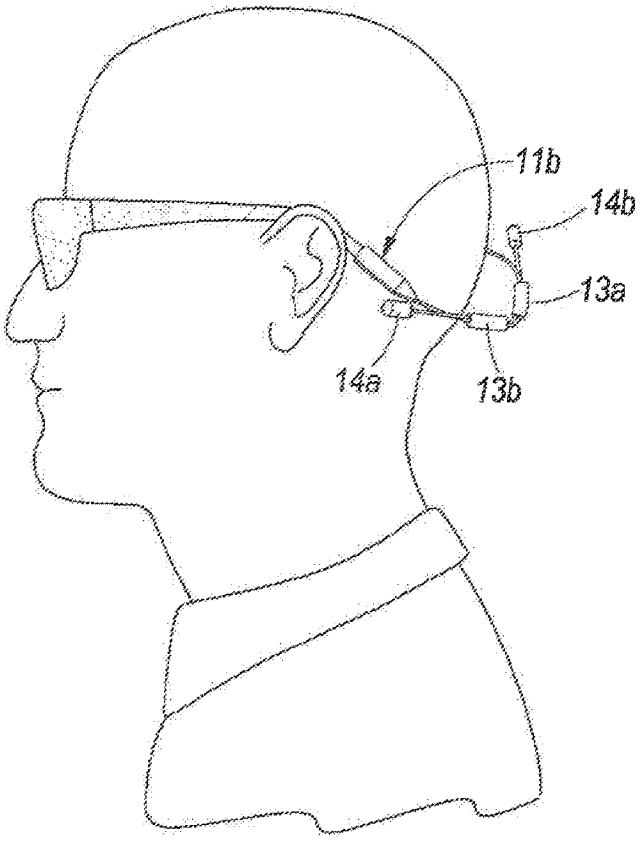
Figure 13B:
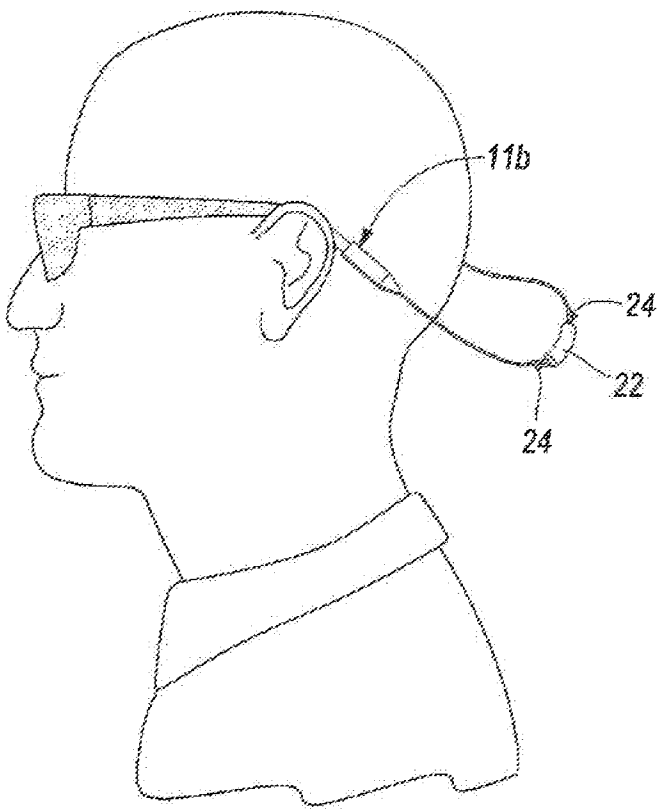
FIG. 13 contains two left side views of the embodiment [with one guide and tabs, each tab secured to the end of one cable and each tab disposed around the other cable and allowing the other cable to pass through slideably. The invention is shown] *of FIG. 10* attached to eyeglass temples and worn over the ears, 13a showing the [invention] *device* adjusted inwardly toward the head, and 13b showing outward adjustment.
Figure 13A:
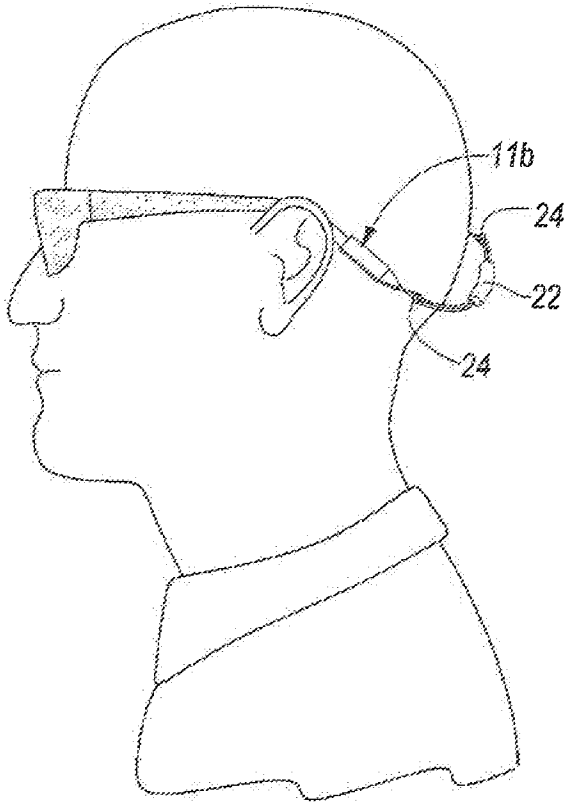
Figure 14B:
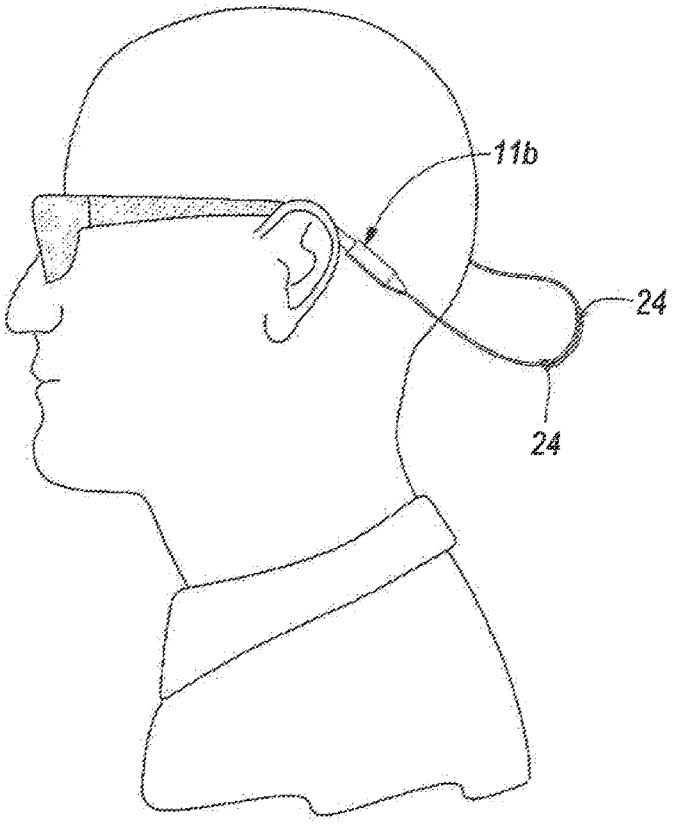
FIG. 14 contains two left side views of the embodiment [without a guide and tabs each tab secured to the end of one cable and each tab disposed around the other cable and allowing the other cable to pass through slideably. The invention is shown] *of FIG. 11* attached to eyeglass temples and worn over the ears, 14a showing the [invention] *device* adjusted inwardly toward the head, and 14b showing outward adjustment.
Figure 14A:
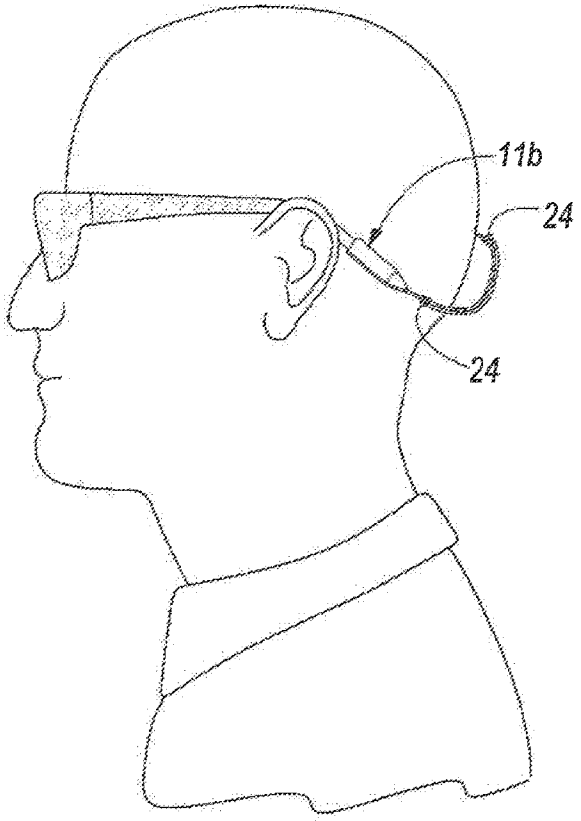

FIG. 10 depicts an embodiment with one guide 22 with the two cables passing through the guide 22. This embodiment also shows cable 12a being secured to a tab 24 and cable 12b passing slideably through a tunnel 25 shown in the inset on in FIG. 10. The tab 24 on the other side of FIG. 10, not shown, would be reversed, with cable 12b being secured to the tab 24 and cable 12a passing slideably through a tunnel 25. FIG. 11 is similar to FIG. 10, but shows an embodiment of the invention [without a guide. The] *in which the tabs act as a guiding means. The tunnels in the* tabs 24 in FIG. 11[, the embodiment without the guide], keep the cables connected to one another slideably *as the tunnel(s) in the separate guide member(s) in other embodiments do*. The inset on FIG. 10 is equally applicable to FIG. 11.

In the final three FIGS. the tightened and loosened positions of [the] *three embodiments of* invention with the suspended arc above the wearer's neck, shoulders and garments are shown [in three embodiments]: with two guides and tabs which do not contain a tunnel for one of the cables—12A,B; with one guide and tabs with a tunnel for one of the cables—13A,B; and without a *separate* guide *member* but with each tab containing a tunnel for one of the cables *and acting as a guide*—14A,B. The number of guides can be selected independently of whether one of the cables passes through a tunnel in the tab. However, if there is not at least one *separate* guide then each tab must have a tunnel through which one of the cables passes through slideably *to serve as a guiding means*, in order to keep the device together.

While the invention is shown in several forms, it will be obvious to those skilled in the art that it is not so limited, but is susceptible of various changes and modifications without departing from the spirit thereof.

Having set forth the nature of the invention, what is claimed is:

1. An adjustable eyewear retention device, comprising:

a. two cables, b. two temple retainers, each having an opening for receiving the end of an eyeglass temple and each secured to a first end of one of the two cables, c. two tabs, each of which is secured to a second end of one of the two cables, and d. at least one guide through which the two cables pass slideably;

e. such that when each said opening is attached to the end of an eyeglass temple and the eyeglasses are worn over the ears of a wearer, the two cables partially overlap and form an arc suspended above the wearer's neck, shoulders or garments, and such that moving the tabs adjusts the length of the arc.

2. The invention as in claim 1, further comprising a tunnel in each of the two tabs which allows one of the cables to pass through slideably.

3. The invention as in claim 2, further comprising deleting the at least one guide through which the two cables pass slideably.

4. The invention as in claim 1, in which the at least one guide allows the two cables to move by frictional loading.

5. The invention as in claim 1, [further comprising] *wherein* pulling the tabs away from the at least one guide decreases the length of the arc, and pushing the tabs toward the at least one guide increases the length of the arc.

6. The invention in claim 1, further comprising at least [two guides] *a second guide* through which the two cables pass slideably, there being a dimension between the [at least two] guides along the cables and a dimension between each said guide and one of the tabs along one of the cables, and wherein pulling either of the two tabs towards the ears causes the dimension between the [at least two] guides to decrease and pushing either of the two tabs away from the ears causes the dimension between the [at least two] guides to increase.

7. The invention in claim 1, [further comprising] *wherein* the at least one guide [being] *is* positioned such that the two cables are in close proximity to one another and partially overlap one another, and each said tab extends outward away from the at least one guide.

8. The invention in claim 1, [further comprising] *wherein* the at least one guide [being] *is* arcuate in shape.

9. The invention in claim 1, [further comprising] *wherein* the two cables [being composed of] *comprise a* material selected from the group of monofilament fishing line, twisted metal cable, and plastic tubing.

10. The invention as recited in claim 1, [further comprising] *wherein* one of the two cables [being] *is* fixed inside [each said] *the at least one* guide.

11. An adjustable eyewear retention device, comprising:

a. two cables, b. means for retaining the temples of a pair of eyeglasses to the ends of said cables, c. means for grasping the terminus of each said cable at an end distal from said retention means, d. means for guiding said two cables such that each cable is positioned close to one another, and e. wherein the two cables form an arc suspended above the wearer's neck, shoulders or garments, and wherein the two cables are movable through said guiding means responsive to moving each grasping means to allow adjustment of the arc to or from the head of a user.

12. The invention as in claim 11, in which the guiding means allow the two cables to move by frictional loading.

13. The invention in claim 11, [further comprising] *wherein* the two cables [being composed of] *comprise* material selected from the group of monofilament fishing line, twisted metal cable, and plastic tubing.

* * * * *